United States Patent
Wiersma

(10) Patent No.: US 9,632,513 B2
(45) Date of Patent: Apr. 25, 2017

(54) TANK MONITOR CONTROL DEVICE

(71) Applicant: Roger Wiersma, Pacific, MO (US)

(72) Inventor: Roger Wiersma, Pacific, MO (US)

(73) Assignee: Husky Corporation, Pacific, MO (US)

( * ) Notice: Subject to any disclaimer, the term of this patent is extended or adjusted under 35 U.S.C. 154(b) by 67 days.

(21) Appl. No.: 14/544,834

(22) Filed: Feb. 24, 2015

(65) Prior Publication Data
US 2015/0261227 A1  Sep. 17, 2015

Related U.S. Application Data

(60) Provisional application No. 61/967,260, filed on Mar. 13, 2014.

(51) Int. Cl.
| | |
|---|---|
| *F16K 21/18* | (2006.01) |
| *F16K 31/20* | (2006.01) |
| *F16K 31/26* | (2006.01) |
| *B01D 3/42* | (2006.01) |
| *G05D 9/12* | (2006.01) |
| *G05D 9/00* | (2006.01) |
| *G01F 23/74* | (2006.01) |

(52) U.S. Cl.
CPC .............. *G05D 9/12* (2013.01); *G01F 23/74* (2013.01); *G05D 9/00* (2013.01); *Y10T 137/7287* (2015.04)

(58) Field of Classification Search
CPC ....... Y10T 137/72878; Y10T 137/7297; Y10T 137/73; Y10T 137/7303; Y10T 137/7306; Y10T 137/86187; G05D 9/00; G05D 9/12
USPC .......................... 137/386, 389, 390, 392, 395
See application file for complete search history.

(56) References Cited

U.S. PATENT DOCUMENTS

| | | | |
|---|---|---|---|
| 4,672,842 A | 6/1987 | Hasselmann | |
| 4,827,762 A | 5/1989 | Hasselmann | |
| 5,025,827 A * | 6/1991 | Weng .................... | F16K 21/185 137/392 |
| 5,609,191 A * | 3/1997 | Topping ................. | B67D 7/002 137/565.17 |
| 5,942,980 A | 8/1999 | Hoben et al. | |
| 6,336,362 B1 | 1/2002 | Duenas | |
| 6,401,045 B1 | 6/2002 | Rogers et al. | |
| 6,766,835 B1 | 7/2004 | Fima | |
| 6,934,644 B2 | 8/2005 | Rogers et al. | |
| 7,140,404 B2 | 11/2006 | Cupples et al. | |
| 7,457,869 B2 | 11/2008 | Kernan | |
| 7,471,208 B1 | 12/2008 | Hoben et al. | |
| 7,561,040 B2 | 7/2009 | Reid et al. | |
| 7,720,618 B2 | 5/2010 | Zarowny et al. | |
| 7,992,433 B2 | 8/2011 | Ziegler et al. | |
| 8,068,727 B2 | 11/2011 | Phillips et al. | |
| 8,656,774 B2 | 2/2014 | Moss | |
| 8,666,683 B2 | 3/2014 | Rogers et al. | |
| 8,852,512 B2 | 10/2014 | Lam et al. | |

(Continued)

*Primary Examiner* — Mary McManmon
*Assistant Examiner* — Hailey K Do
(74) *Attorney, Agent, or Firm* — Paul M. Denk

(57) ABSTRACT

A tank monitor control device is disclosed which comprises a monitoring device for insertion into a day tank to monitor a level of fluid stored in the day tank, a shutoff valve connected between a main storage tank and a diaphragm pump, a solenoid valve connected between an air supply and the diaphragm pump, and a control device connected to the monitoring device for receiving a signal indicative of the level of fluid in the day tank, the control device connected to the shutoff valve and the solenoid valve.

2 Claims, 4 Drawing Sheets

(56) References Cited

U.S. PATENT DOCUMENTS

| | | | |
|---|---|---|---|
| 8,872,651 B2 | 10/2014 | Reid et al. | |
| 2006/0196541 A1* | 9/2006 | Gerken | B67D 7/0272 137/209 |
| 2013/0015199 A1* | 1/2013 | Tavolazzi | B67D 1/0004 222/1 |

* cited by examiner

TANK MONITOR CONTROL DEVICE

CROSS REFERENCE TO RELATED APPLICATION

This non-provisional patent application claims priority to the provisional patent application having Ser. No. 61/967,260, filed on Mar. 13, 2014.

FIELD OF THE DISCLOSURE

This disclosure generally relates to monitoring and control systems, and more particularly to a tank monitor control device for controlling operation of various devices associated with a storage tank.

BACKGROUND

Day tanks are used to store a supply of fuel that is separate from a main fuel storage tank. The day tank has enough fuel stored therein to be able to supply fuel to, for example, a generator or a heater for at least a day. In some areas it may take a day to obtain a delivery of fuel to replenish the main fuel storage tank. In this situation, the day tank will be able to store enough fuel to power a generator or heater until a deliver is made to replenish the main fuel storage tank.

It is also known that some establishments generate waste oil and the waste oil is used to fuel generators or heaters. Use of waste oil helps in reducing energy costs. For example, waste oil is stored in a main storage tank and is pumped to a day tank to supply a generator or a heater. Instead of having to purchase fuel or electricity, the waste oil is used to fuel a generator or a heater. In this manner, energy costs are saved or reduced.

The day tank may have one or more threaded openings in the top of the tank. One of the openings may be a 2 inch diameter bung hole opening that is used to fill or empty the container. Another one of the openings may be a ¾ inch diameter bung hole opening used for ventilation of the contents of the tank. Over time, the contents of the day tank are emptied and it is important to know when the day tank has reached a low level condition to pump or transfer waste oil from the main storage tank to the day tank to refill the day tank. It is also desirable to know when the day tank has been filled to an upper level condition to shutoff a pump device that is pumping waste oil from the mail storage tank to the day tank. It is extremely important to avoid an overflow condition where waste oil could exit out of the day tank and contaminant any surrounding area. Cleaning up spilled waste oil can be expensive and should be avoided.

In order to determine the level of the contents within the day tank, various gauges have been used. For example, a float device may be inserted into the tank to determine the level of liquid contents. A stick gauge may also be inserted into the tank to determine the level of the contents within the tank. However, such gauges do not provide any warning or indication as to when the contents of the tank reaches a critical level. Also, none of these devices is capable of controlling the pumping of waste oil from the main storage tank to the day tank. Further, these devices do not assist in avoiding an overflow condition.

The present disclosure is designed to obviate and overcome many of the disadvantages and shortcomings experienced with prior devices for determining a level of liquid in a day tank and for controlling operation of a pump that transfers waste oil from a main storage tank to a day tank. Moreover, the present disclosure is related to a tank monitor control device that can determine when the tank will be empty, full, or at an overflow condition.

SUMMARY OF THE DISCLOSURE

The present disclosure is a tank monitor control device which comprises a monitoring device for insertion into a day tank to monitor a level of fluid stored in the day tank, a shutoff valve connected between a main storage tank and a diaphragm pump, a solenoid valve connected between an air supply and the diaphragm pump, and a control device connected to the monitoring device for receiving a signal indicative of the level of fluid in the day tank, the control device connected to the shutoff valve and the solenoid valve.

In another form of the present disclosure, a tank monitor control device comprises a monitoring device for insertion into a day tank to monitor a level of fluid stored in the day tank, a shutoff valve connected between a main storage tank and a diaphragm pump, a solenoid valve connected between an air supply and the diaphragm pump, and a control device positioned at a location remote from the monitoring device, the control device electrically connected to the monitoring device for receiving a signal indicative of the level of fluid in the day tank, the control device connected to the shutoff valve and the solenoid valve.

In yet another form of the present disclosure, a tank monitor control device is disclosed which comprises a monitoring device for insertion into a day tank to monitor a low level of waste oil stored in the day tank to produce a low level signal, a high level of fluid stored in the day tank to produce a high level signal, and an overflow level of fluid stored in the day tank to produce an overflow level signal, a shutoff valve connected between a main storage tank and a diaphragm pump, a solenoid valve connected between an air supply and the diaphragm pump, and a control device connected to the monitoring device for receiving the low level signal, the high level signal, and the overflow level signal, the control device connected to the shutoff valve and the solenoid valve.

The present disclosure provides a tank monitor control device that can be easily employed with highly reliable results to control a waste oil storage and supply system.

The present disclosure further provides a tank monitor control device that provides an audible alarm when an overflow condition has been detected.

The present disclosure provides a tank monitor control device that requires only a few tools for installation in a day tank or removal from a day tank.

The present disclosure provides a tank monitor control device that is easy to program to detect various operating conditions.

The present disclosure is further directed to a tank monitor control device that can replace existing gauges and does not require a day tank to be retrofitted for use of the tank monitor control device of the present disclosure.

The present disclosure also provides a tank monitor control device that can be constructed of readily available components for easy installation into a day tank.

The present disclosure is directed to a tank monitor control device that provides for manual filling of a waste fuel day tank during off hours.

The present disclosure provides a tank monitor control device that automatically ensures that a waste fuel day tank is full for optimum heating or operation.

These and other advantages of the present disclosure will become apparent to those skilled in the art after considering the following detailed specification in conjunction with the accompanying drawings.

DETAILED DESCRIPTION OF PREFERRED EMBODIMENTS

Figure 1:
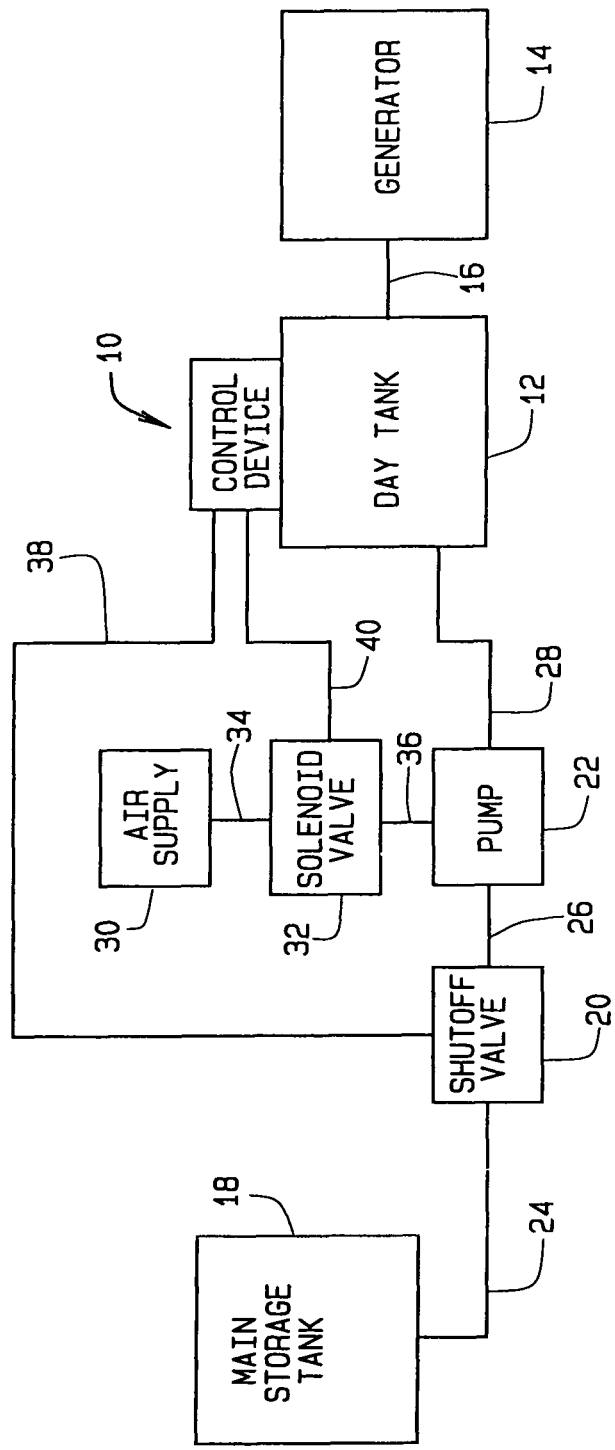
FIG. 1 is a block diagram of a tank monitor control device constructed according to the present disclosure.

Referring now to the drawings, wherein like numbers refer to like items, number 10 identifies a preferred embodiment of a tank monitor control device constructed according to the present disclosure. With reference now to FIG. 1, the tank monitor control device 10 is shown being positioned above and connected to a day tank 12 that contains a quantity of waste oil (not shown). Although not shown, a monitoring device is inserted into the day tank 12 through a bung hole (not shown) positioned on top of the day tank 12, as will be described in detail further herein. The monitoring device is connected to the control device 10, as will be described in detail further herein. The device 10 is capable of monitoring various levels of waste oil stored in the day tank 12. For example, a low level condition, a high level condition, and an overflow condition may be monitored by the device 10. The day tank 12 provides waste oil to a generator 14 by a pipe or conduit 16. The generator 14 may also be a heating unit that is used to heat an enclosed structure, such as a garage. In this manner, waste oil is used to generate power or heat that would otherwise have to be provided by paying a utility company for electricity or gas. The day tank 12 receives waste oil from a main storage tank 18 through an emergency or overflow shutoff valve 20 and a diaphragm pump 22. The main storage tank 18 is connected to the shutoff valve 20 by a pipe or conduit 24, the shutoff valve 20 is connected to the pump 22 by a pipe or conduit 26, and the pump 22 is connected to the day tank 12 via a pipe or conduit 28. In this manner, the day tank 12 is filled with waste oil from the storage tank 18 through the pipe 24, the shutoff valve 20, the pipe 26, the pump 22, and the pipe 28. As can be appreciated, if either the shutoff valve 20 is activated or the pump 22 is deactivated then no waste oil will flow to the day tank 12.

The pump 22 is connected to an air supply 30 through a solenoid valve 32. The air supply 30 provides a supply of air through a pipe or conduit 34 to the solenoid valve 32 and through the solenoid valve 32 to the pump 22 via a pipe or conduit 36. In this manner, air flows from the air supply 30 through the solenoid valve 32 to operate the pump 22. When the pump 22 is operating or moving, waste oil from the storage tank 18 is pumped into the day tank 12. Although the control device 10 has been described as being used with waste oil being stored in the main storage tank 18 and the day tank 12, it is also possible that the tanks 12 and 18 may be used to store oil, diesel fuel, antifreeze, and other fluids having a low flash point.

The control device 10 is connected to the shutoff valve 20 by an electrical connection, wire, or cable 38. The control device 10 can control operation of the shutoff valve 20 by sending a signal over the electrical connection 38. In particular, when an overflow condition is detected by the control device 10, a signal is sent over the electrical connection 38 to operate the shutoff valve 20 to stop the flow of waste oil from the main storage tank 18 to the day tank 12. The control device 10 is also connected to the solenoid valve 32 via an electrical connection, wire, or cable 40. The control device 10 can control operation of the solenoid valve 32 by sending a signal over the electrical connection 40. For example, manual filling of the day tank 12 may be desirable. In order to accomplish this, the control device 10 sends a signal over the electrical connection 40 to operate the solenoid valve 32 to allow air to flow from the air supply 30 to the pump 22. Although electrical connections 38 and 40 have been described, it should be understood that such connections 38 and 40 may include one or more wires, leads, cables, or conductors, as will be described more fully herein.

Figure 2:
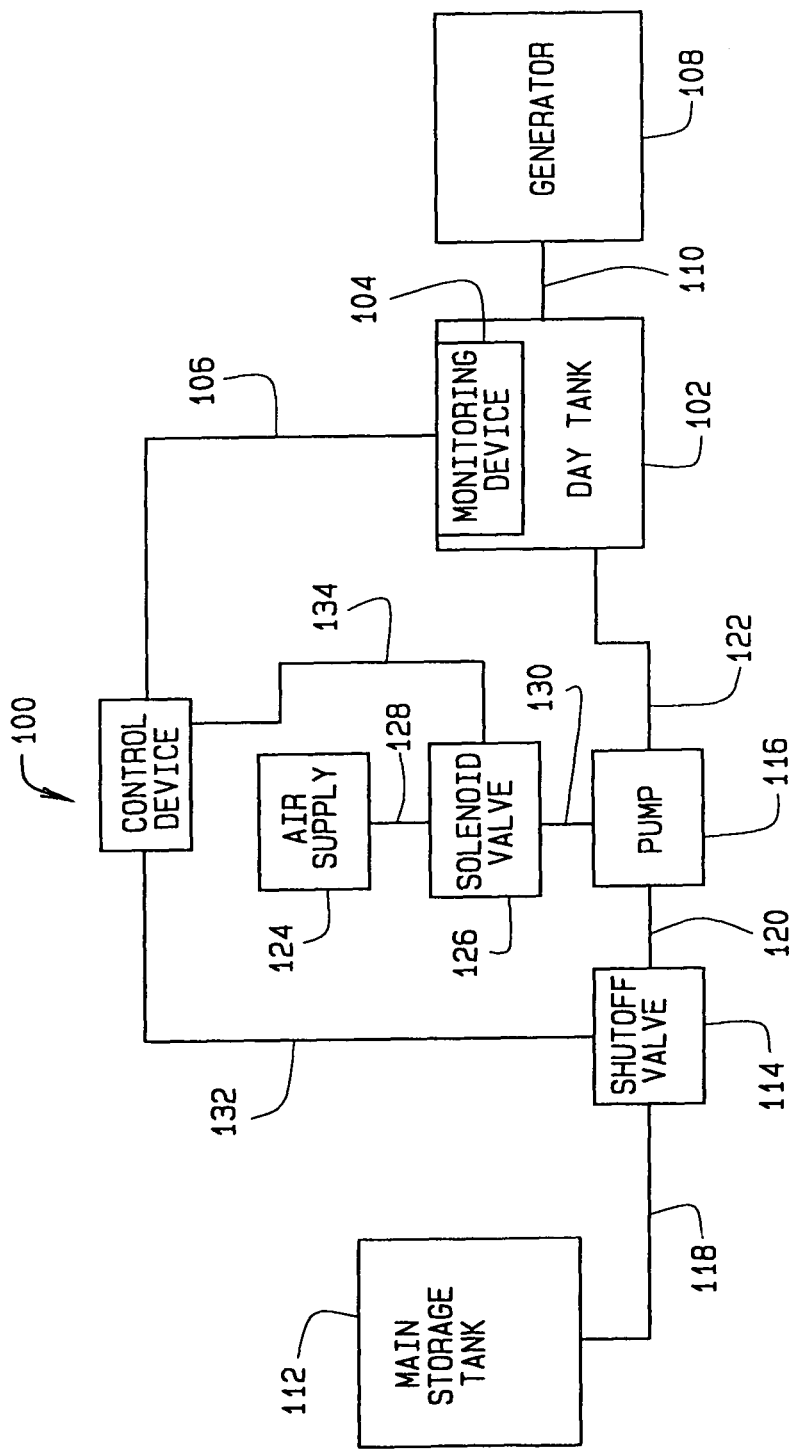
FIG. 2 is a block diagram of another embodiment of a tank monitor control device constructed according to the present disclosure.

With reference now to FIG. 2, a tank monitor control device 100 is shown being positioned at a location remote from a day tank 102. For example, the tank monitor control device 100 may be mounted on a wall in a room that is remote from the day tank 102. The control device 100 is capable of monitoring various levels of waste oil stored in the day tank 102 by use of various level sensors 104 inserted into the day tank 102. The control device 100 is connected to the level sensors 104 by various wires 106. For example, the level sensors 104 are used to determine, monitor, or sense a low level condition, a high level condition, and an overflow condition. The day tank 102 provides waste oil to a generator 108 by a pipe or conduit 110. The generator 108 may also be a heating unit that is used to heat an enclosed structure, such as a garage. In this manner, waste oil is used to generate power or heat that would otherwise have to be provided by paying a utility company for electricity or gas. The day tank 102 receives waste oil from a main storage tank 112 through an emergency or overflow shutoff valve 114 and a diaphragm pump 116. The main storage tank 112 is connected to the shutoff valve 114 by a pipe or conduit 118, the shutoff valve 114 is connected to the pump 116 by a pipe or conduit 120, and the pump 116 is connected to the day tank 102 via a pipe or conduit 122. In this manner, the day tank 102 is filled with waste oil from the storage tank 112 through the pipe 118, the shutoff valve 114, the pipe 120, the pump 116, and the pipe 122. As can be appreciated, if either the shutoff valve 114 is activated or the pump 116 is deactivated then no waste oil will flow to the day tank 102.

The pump 116 is connected to an air supply 124 through a solenoid valve 126. The air supply 124 provides a supply of air through a pipe or conduit 128 to the solenoid valve 126 and through the solenoid valve 126 to the pump 116 via a pipe or conduit 130. In this manner, air flows from the air supply 124 through the solenoid valve 126 to operate the pump 116. When the pump 116 is operating or moving, waste oil from the storage tank 112 is pumped into the day tank 102.

The control device 100 is connected to the shutoff valve 114 by an electrical connection 132. The control device 100 can control operation of the shutoff valve 114 by sending a signal over the electrical connection 132. In particular, when an overflow condition is detected by the control device 100, a signal is sent over the electrical connection 132 to operate the shutoff valve 114 to stop the flow of waste oil from the main storage tank 112 to the day tank 102. The control device 100 is also connected to the solenoid valve 126 via an electrical connection 134. The control device 100 can control operation of the solenoid valve 126 by sending a signal over the electrical connection 134. For example, if manual filling of the day tank 102 is desired, then the control device 100 sends a signal over the electrical connection 134 to operate the solenoid valve 126 to allow air to flow from the air supply 124 to the pump 116.

Figure 3:
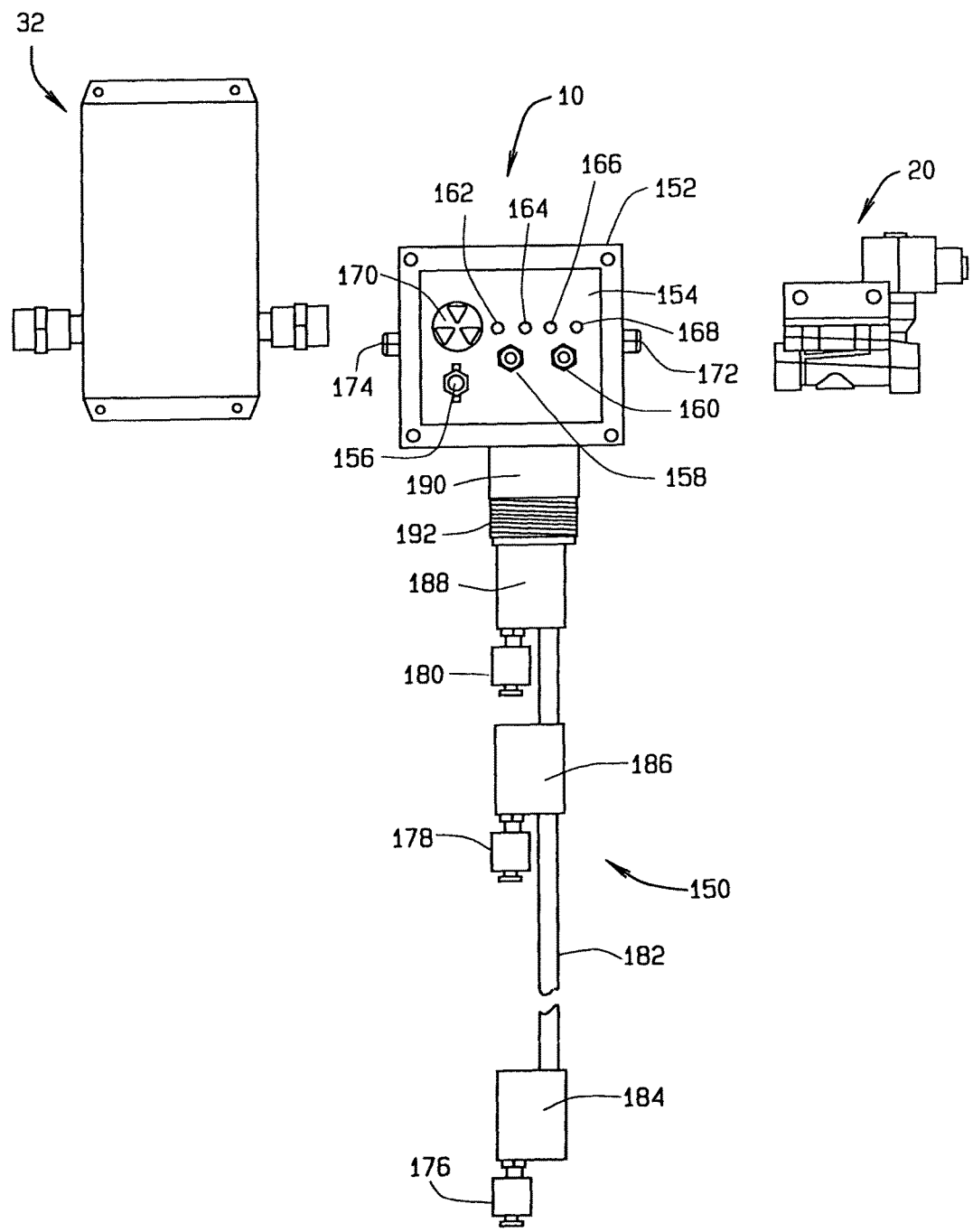
FIG. 3 is a perspective view of the tank monitor control device connected to a monitoring device, and adapted to be connected to a shutoff valve and a solenoid valve constructed according to the present disclosure.

FIG. 3 is a perspective view of the control device 10 connected to a monitoring device 150 and adapted to be connected the shutoff valve 20 and the solenoid valve 32. The control device 10 has a housing 152 having a front face plate 154. Provided on the face plate 154 is an on off toggle switch 156, a manual fill push button 158, a test push button 160, an overflow indicator 162, a pump indicator 164, a level within range indicator 166, a power indicator 168, and an audible alarm or siren 170. The indicators 162, 164, 166, and 168 may be LEDs (light emitting diodes). The siren 170 may be operated to indicate an overflow condition has been detected. A right side cord grip 172 is provided on the housing 152 and the electrical connection 38 (FIG. 1) may be threaded through the cord grip 172 to connect the control device 10 to the shutoff valve 20. A left side cord grip 174 is also provided on the housing 152 and the electrical connection 40 (FIG. 1) may be threaded through the cord grip 174 to connect the control device 10 to the solenoid valve 32. It is also possible that only one of the cord grips 172 and 174 may be provided on the housing 152.

The monitoring device 150, which is inserted into the day tank 12 to monitor the level of waste oil in the day tank 12, has a low level reed switch 176, a high level reed switch 178, and an overflow level reed switch 180. As can be appreciated, the level of waste oil within the day tank 12 can be monitored or detected by the reed switches 176, 178, and 180. A tube 182 has a low spacer 184 positioned thereon with the lower spacer 184 have the low level reed switch 176 connected thereto. A high spacer 186 is also connected to the tube 182 and the high level reed switch 178 is connected to the high spacer 186. Further, the overflow level reed switch 180 is connected to an overflow spacer 188. An adapter 190 is used to connect the control device 10 to the monitoring device 150. The adapter 190 has a threaded end 192 that is used to secure the adapter 190 to a threaded opening (not shown) associated with the day tank 12. Once threaded into position, the control device 10 and the monitoring device 150 are held in place with respect to the day tank 12. The tube 182 also allows for any electrical connections between the reed switches 176, 178, and 180 and the control device 10 to pass through the tube 182. The tube 182 can also have any length with the length being dependent upon the height or depth of the day tank 12.

Figure 4:
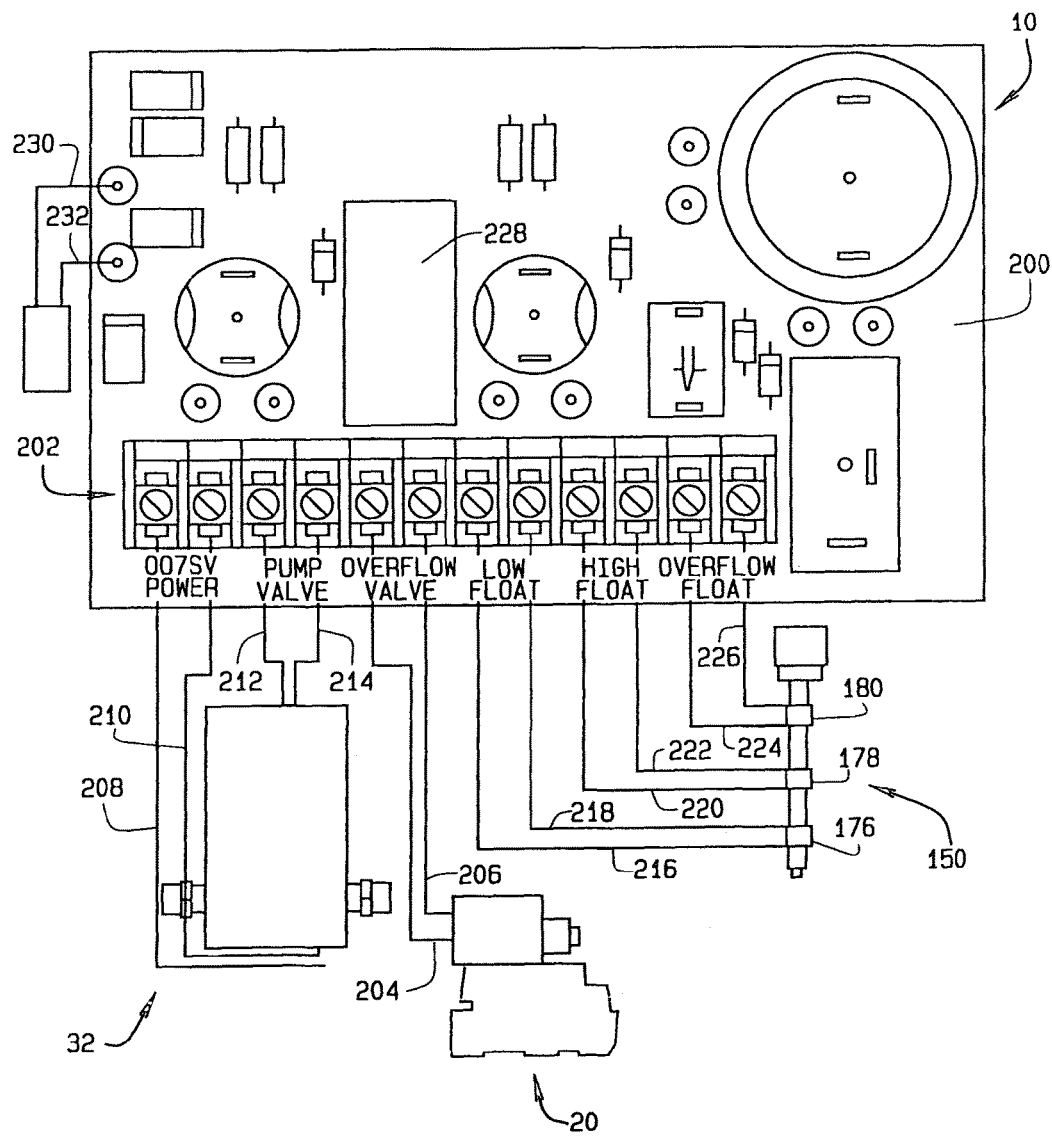
FIG. 4 is a perspective view of a circuit board installed in the tank monitor control device with the control board being connected to a monitoring device, a shutoff valve, and a solenoid valve.

With reference now to FIG. 4, a circuit board 200, which may be installed in the control device 10, is shown being connected to the shutoff valve 20, the solenoid valve 32, and the monitoring device 150. The circuit board 200 has a terminal block 202 that provides for connection of the various electrical connections, such as electrical connections 38 and 40 (FIG. 1) or 106, 132, and 134 (FIG. 2). The overflow valve 20 may be connected to the terminal block 202 by a pair of wires 204 and 206. A signal sent over the wires 204 and 206 from the control device 10 will control the operation of the overflow valve 20. As can be appreciated, if the monitoring system 150 detects an overflow condition by the overflow level reed switch 180 being activated, then the control device 10 will send a signal to activate the overflow valve 20 to stop any waste oil from being pumped. The solenoid valve 32 is connected to the terminal block 202 by a first pair of power wires 208 and 210 and a pair of control wires 212 and 214. Power from the circuit board 200 is provided to the solenoid valve 32 over the wires 208 and 210. A signal to control operation of the solenoid valve 32 is provided over the wires 212 and 214. For example, if the monitoring system 150 detects a low level condition by the low level reed switch 176 being activated, then the control device 10 will send a signal over the wires 212 and 214 to activate the solenoid valve 32. The control device 10 may also send a signal over the wires 212 and 214 when the manual fill push button 158 (FIG. 3) is manually activated. The button 158 may be operated after working hours to manually fill the day tank 12.

The monitoring system 150 is connected to the terminal block 202 in the following manner. A pair of wires 216 and 218 connect the low level reed switch 176 to the block 202, a pair of wires 220 and 222 connect the high level reed switch 178 to the block 202, and a pair of wires 224 and 226 connect the overflow level reed switch 180 to the block 202. In this manner, when the low level reed switch 176 is activated, which corresponds to waste oil dropping below the switch 176, a signal is sent over the wires 216 and 218 to the control device 10. When the high level reed switch 178 is activated, which indicates that the level of waste oil is above the switch 178, then a signal is provided over the wires 220 and 222 to indicate a high level has been obtained. Also, when the overflow level reed switch 180 is activated, this corresponds to an overflow condition and a signal is sent to the control device 10 over the wires 224 and 226. Although the wires 216, 218, 220, 222, 224, and 226 are illustrated being connected to their respective reed switches 176, 178, and 180, as has been discussed, the wires 216, 218, 220, 222, 224, and 226 are routed through the tube 182 (FIG. 3). The wires 216, 218, 220, 222, 224, and 226 are only shown in this manner for purposes of clarity.

The circuit board 200 also includes other components such as a control circuit 228 and power leads 230 and 232. The control circuit 228 may be a microcontroller, a microprocessor, an ASIC (applications specific integrated circuit), or other integrated circuit device or chip. The control circuit 228 may include software code or a software program for controlling operation of the control device 10. Other components, such as an RAM (random access memory) chip, an EPROM (electrically programmable read only memory) chip, an electronically erasable programmable read only memory chip, an PLA (programmable logic array) chip may also be part of the circuit board 200.

With the control device 10 installed, the control device 10 operates in the following manner. Typically, waste oil will be stored in the day tank 12 and the level of waste oil will be between the high level reed switch 178 and the overflow reed switch 180. The level within range indicator 166 will be activated to indicate that the day tank 12 is full. Over time, waste oil will be sent to the generator 14. As the day tank 12 empties, the low level reed switch 176 will be energized. Once this occurs, a signal will be sent by the control device 10 over the electrical connection 40 to operate the solenoid valve 32 to allow waste oil from the main storage tank 18 to be pumped into the day tank 12. At some point during the pumping process, the high level reed switch 178 will become activated. The control device 10 will wait until the overflow reed switch 180 becomes active and then send a signal over the electrical connection 38 to activate the shutoff valve 20 to stop the pumping of waste oil from the main storage tank 18 to the day tank 12. The control device 100 functions in the same manner. One of the differences between the control device 10 and the control device 100 is that the control device 100 is located remotely from the day tank 102. As can be appreciated, the control device 10 is capable of performing various other functions or procedures, such as being able to manually fill the day tank 12 and to test the control device 10.

From all that has been said, it will be clear that there has thus been shown and described herein a tank monitor control device. It will become apparent to those skilled in the art, however, that many changes, modifications, variations, and other uses and applications of the subject tank monitor control device are possible and contemplated. All changes, modifications, variations, and other uses and applications which do not depart from the spirit and scope of the disclosure are deemed to be covered by the disclosure, which is limited only by the claims which follow.

I claim:

1. A tank monitor control device for use with a day tank that is supplied with waste oil pumped from a main storage tank, during its usage, and for application to fuel a generator or heater, comprising:
   a main storage tank;
   a day tank, capable of receiving waste oil through a conduit from the main storage tank;
   a monitoring device for insertion into said day tank to monitor a low level of waste oil stored in the day tank to produce a low level signal upon said monitoring device, a high level of fluid stored in the day tank to produce a high level signal upon said monitoring device, and a over flow level of fluids stored in the day tank to produce an overflow level signal upon said monitoring device;
   a shutoff valve connected between said main storage tank and a diaphragm pump;
   a solenoid valve connected between an air supply and the diaphragm pump;
   a control device connected to the monitoring device for receiving a signal indicative of the level of fluid in the said day tank, the control device connected to the shutoff valve and the solenoid valve, said control device for receiving the low level signal, the high level signal, and the over flow level signal, and the said control device connected for controlling the operations of the shutoff valve and the solenoid valve;
   said control device comprising a housing having a front face, the housing including a control board having a terminal block for electrically connecting the control device to the shutoff valve and the solenoid valve;
   said control device front face plate having an on off toggle switch, a manual fill push button, a test push button, an overflow indicator, a pump indicator, a level within range indicator, a power indicator, and an audible alarm;
   said monitoring device comprises a tube and three reed switches disposed along the tube, said reed switches comprising a low reed switch, a high level reed switch, and an overflow level reed switch, all for detecting the various levels of the waste oil pumped to the day tank; and
   said control device connected to the solenoid valve controls the delivery of the air supply to the diaphragm pump to achieve pumping of the waste oil to the day tank, and said control device operating said shutoff valve for shutting off the further flow of waste oil to the day tank from the main storage tank when the overflow level signal indicates that the day tank is filled to capacity with waste oil.

2. The tank monitor control device of claim 1 wherein the control device provides power to the solenoid valve.

* * * * *